United States Patent
Wang (10) Patent No.: US 7,408,684 B2
(45) Date of Patent: Aug. 5, 2008

(54) LIGHT SOURCE DEVICE CAPABLE OF REPRESSING THE LIGHT SURGE

(75) Inventor: Chih-Kuang Wang, Hsin Chu (TW)

(73) Assignee: Microtek International Inc., Hsinchu (TW)

(*) Notice: Subject to any disclaimer, the term of this patent is extended or adjusted under 35 U.S.C. 154(b) by 868 days.

(21) Appl. No.: 10/820,944

(22) Filed: Apr. 7, 2004

(65) Prior Publication Data

US 2004/0264167 A1 Dec. 30, 2004

(30) Foreign Application Priority Data

Jun. 30, 2003 (TW) .............................. 92211978 U (51) Int. Cl.
*H04N 1/04* (2006.01)
(52) U.S. Cl. .................... 358/475; 358/473; 358/474
(58) Field of Classification Search ............... 358/475, 358/509, 487, 506, 474, 497, 494, 496, 473; 250/208.1, 216, 205; 399/220, 221; 355/67, 355/68, 71; 362/552, 551, 583, 558; 382/312, 382/313
See application file for complete search history.

(56) References Cited

U.S. PATENT DOCUMENTS

| | | | | | |
|---|---|---|---|---|---|
| 4,623,937 | A | * | 11/1986 | Watanabe | 358/483 |
| 5,475,505 | A | * | 12/1995 | Minasian et al. | 358/474 |
| 5,499,112 | A | * | 3/1996 | Kawai et al. | 358/475 |
| 5,768,663 | A | * | 6/1998 | Lin | 399/220 |
| 5,950,053 | A | * | 9/1999 | Lin | 399/220 |
| 6,037,582 | A | * | 3/2000 | Youngers et al. | 250/234 |
| 6,046,826 | A | * | 4/2000 | Lu et al. | 358/475 |
| 6,133,580 | A | * | 10/2000 | Sun | 250/566 |
| 6,486,978 | B1 | * | 11/2002 | Tsai | 358/475 |
| 6,496,285 | B1 | * | 12/2002 | Fujimoto et al. | 358/475 |
| 6,583,802 | B2 | * | 6/2003 | Sasaki et al. | 347/175 |
| 6,628,437 | B1 | * | 9/2003 | Ooki et al. | 358/509 |
| 2004/0218231 | A1 | * | 11/2004 | Sheng et al. | 358/474 |

FOREIGN PATENT DOCUMENTS

JP 05292254 A * 11/1993

* cited by examiner

*Primary Examiner*—Cheukfan Lee
(74) *Attorney, Agent, or Firm*—Pro-Techtor Int'l Services (57) ABSTRACT

A light source device capable of repressing light surges is fixed in a flatbed scanner to provide a light beam for scanning a document. The light source device includes a bent lamp with bent parts for generating the light beam and compensating for the brightness at two ends of the bent lamp; and a set of obscuring units fixed at the two bent parts to partially obscure the light of the lamp. Hence, the light source device can repress the light surge caused on two ends of the image sensor even if the bent parts at two ends of the lamp are very close to the sides of the scanning window. Therefore, the length of the light source device can be shortened and the width of the flatbed scanner using the light source device can also be narrowed.

11 Claims, 7 Drawing Sheets

LIGHT SOURCE DEVICE CAPABLE OF REPRESSING THE LIGHT SURGE

BACKGROUND OF THE INVENTION

1. Field of the Invention

The invention relates to a light source device, and more particularly to a light source device capable of repressing the light surge by utilizing obscuring units to obscure portions of the light source of the bent lamp.

2. Description of the Related Art

Figure 1:
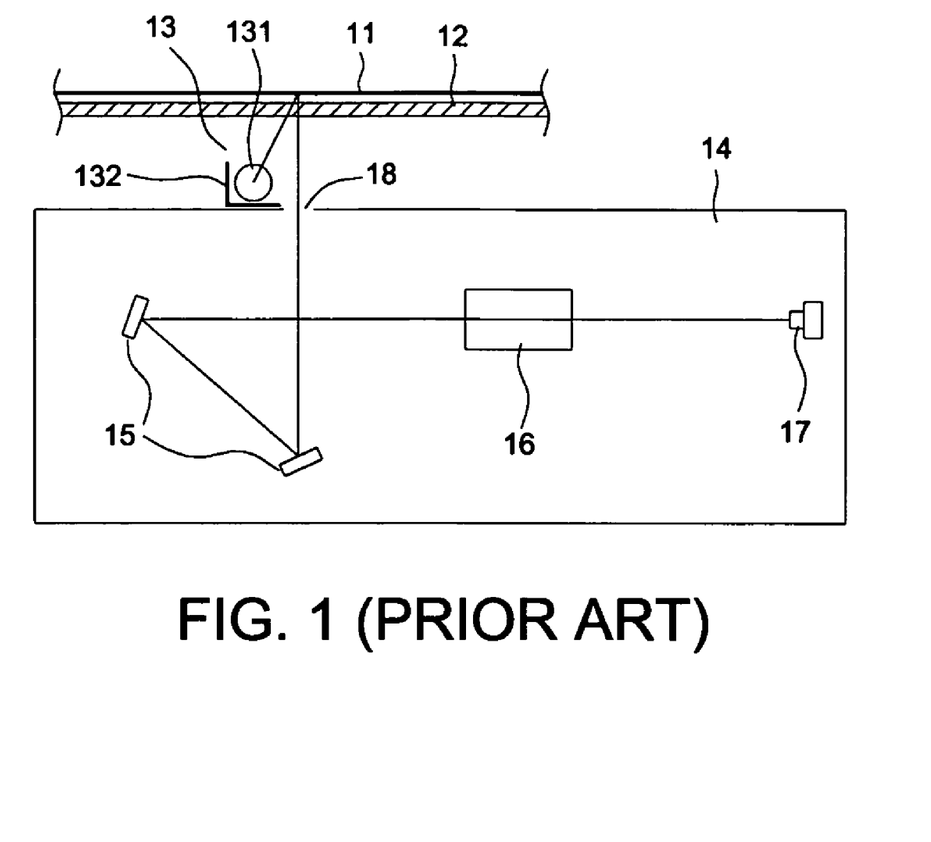
FIG. 1 shows a partial architecture diagram of a conventional flatbed scanner.

FIG. 1 shows a partial architecture diagram of a conventional flatbed scanner. Referring to FIG. 1, the flatbed scanner includes a carriage 14 and a scan platen 12. A to-be-scanned document 11 is placed on the scan platen 12. The carriage 14 includes a light source device (lamp) 13, mirrors 15, a lens 16, and an image sensor 17. The image sensor 17 may be a charge coupled device (CCD). The light source device 13 includes a lamp 131 and a lamp holder 132. The carriage 14 has an image signal inlet 18 at a position close to the light source device 13, such that the scattered light reflected from the to-be-scanned document 11 may enter the carriage 14 via the image signal inlet 18 while the light of the lamp 131 illuminates the to-be-scanned document 11. The light entering the carriage 14 is reflected by the mirrors 15 and then projected onto the image sensor 17 through the lens 16.

Figure 2:
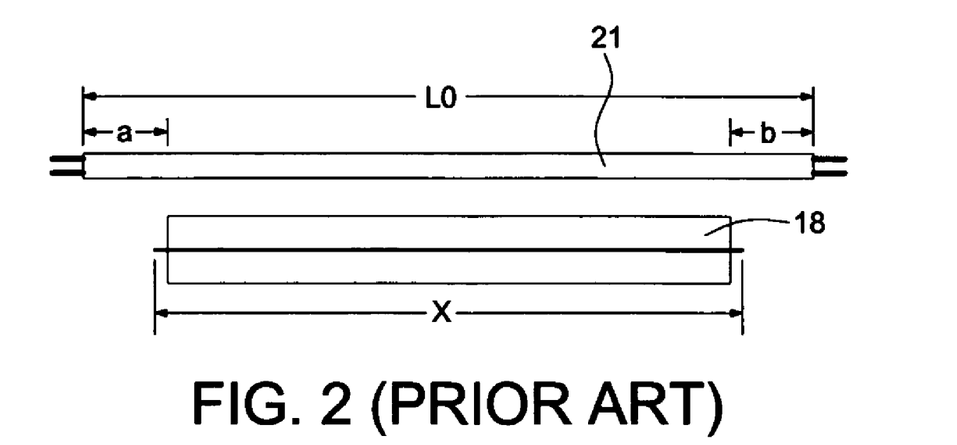
FIG. 2 shows a schematic illustration of a conventional linear lamp applied in a flatbed scanner.

FIG. 2 shows a schematic illustration of a conventional linear lamp applied in a flatbed scanner. As shown in FIG. 2, the lamp 21 has a length of L0 and provides the effective scan width of X, wherein L0 is greater than X. Symbol 18 denotes the image signal inlet 18 of the flatbed scanner. Because the brightness at two ends of the typical lamp (e.g., cold cathode fluorescent lamp) is weaker, the effective scan width X is smaller than the length L0, and some positions (e.g., areas a and b) at the two ends of the lamp 21 cannot provide the sufficient brightness.

Figure 3A:
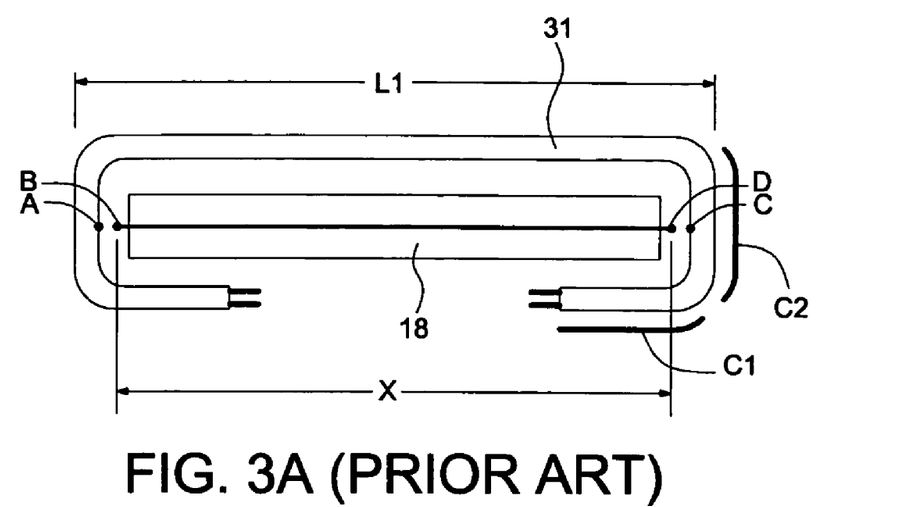
FIG. 3A shows a schematic illustration of a conventional bent lamp applied in a flatbed scanner.
Figure 3B:
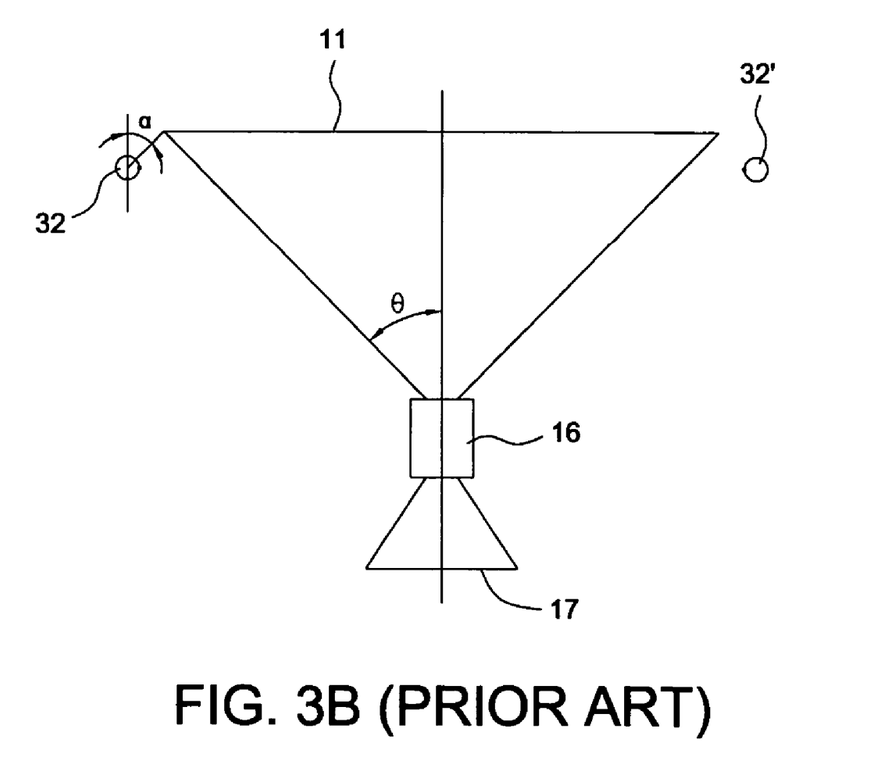
FIG. 3B shows a light path from the lamp to the image sensor.

In order to compensate for the weaker brightness at the two ends of the typical linear lamp 21 of FIG. 2, a bent lamp of FIG. 3A is proposed. As shown in FIG. 3A, the lamp 31 has two U-shape structures at two ends, and each of the U-shape structures has a first compensation section C1 and a second compensation section C2 for respectively compensating for the weaker brightness at two ends of the typical lamp 21. Hence, it is noted from comparing FIG. 2 to FIG. 3A that the length L1 of the lamp 31 of FIG. 3A may be smaller than the length L0 of the lamp 21 of FIG. 2. FIG. 3B shows a light path from the lamp to the image sensor. The symbol θ is the lens half angle and the symbol α is the light angle from the lamp 32 to the terminal of the image signal inlet 18.

Figure 4:
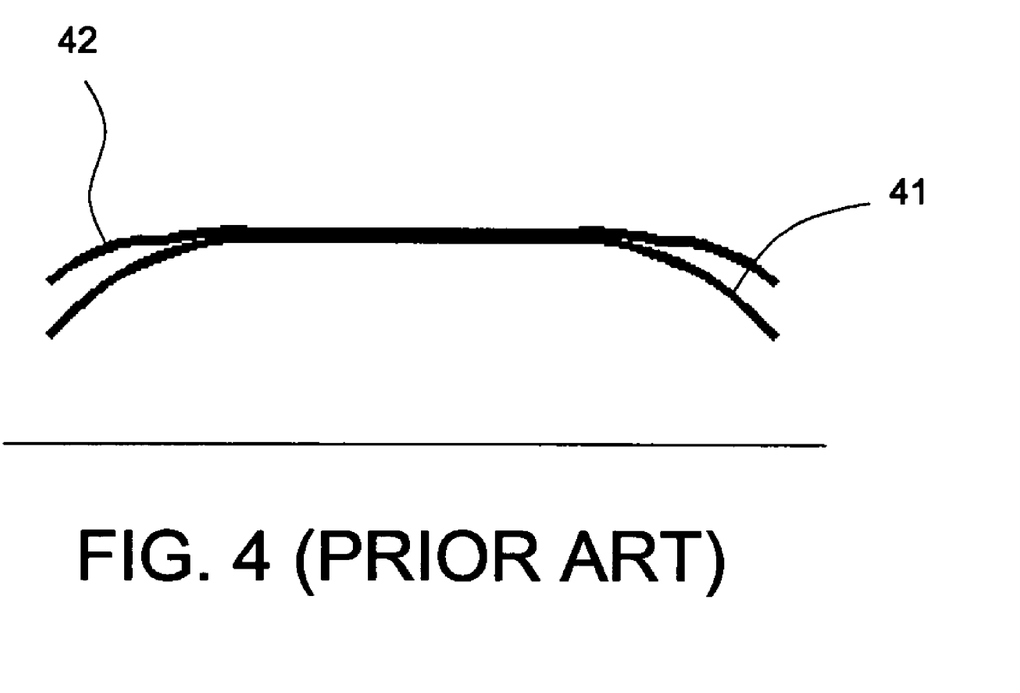
FIG. 4 shows the brightness variations detected by the image sensor from the lamps of FIGS. 2 and 3.

FIG. 4 shows the brightness variations detected by the image sensor from the lamps of FIGS. 2 and 3, wherein the curve 41 denotes the brightness variation of the lamp 21 of FIG. 2, and the curve 42 denotes the brightness variation of the lamp 31 of FIG. 3A. It can be understood from FIG. 4 that better brightness may be provided at two ends of the image signal inlet 18 when the bent lamp of FIG. 3A is utilized. However, if the lamp 31 provides the brightness representation of the curve 42 of FIG. 4, it should be noted that the distance between the point A and the point C at two ends of the lamp 31 of FIG. 3A must greater than the effective scan width X. As shown in FIG. 3B, the angle α must be larger than lens half angle θ. That is, the points A and C at two ends of the lamp 31 have to be located outside the points B and D, which define the two ends of the effective scan width.

Figure 5:
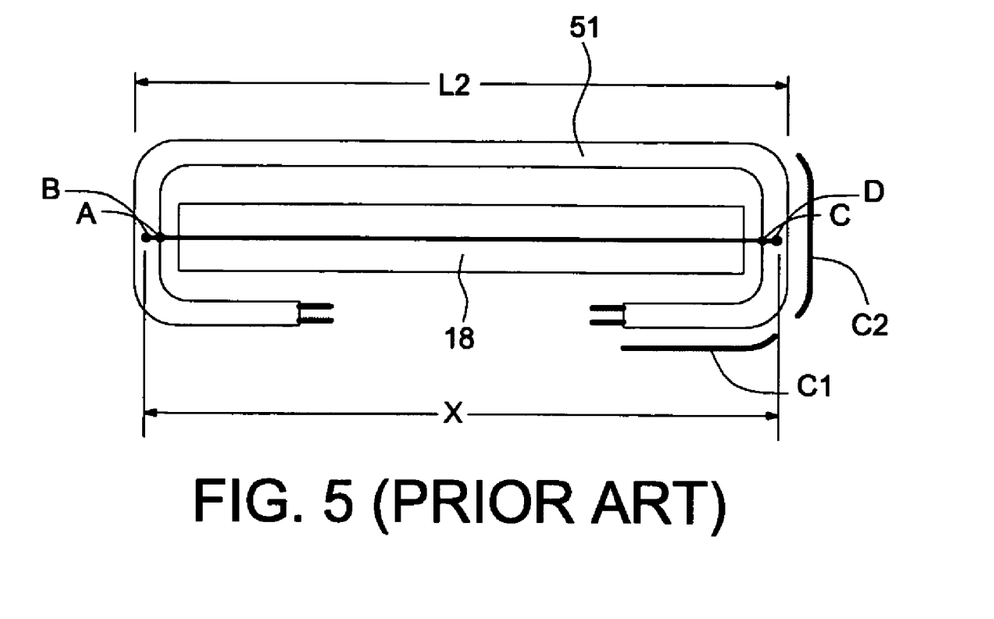
FIG. 5 shows a schematic illustration showing another conventional bent lamp applied in a flatbed scanner.

FIG. 5 shows a schematic illustration showing another conventional bent lamp applied in a flatbed scanner. Each of the lamps of FIGS. 5 and 3 has the U-shaped structures at two ends thereof. But the angle α in FIG. 5 system is smaller then lens half angle θ. That's, the difference between FIGS. 5 and 3 is that the distance from points A to C at two ends of the lamp 51 of FIG. 5 is smaller, even smaller than the effective scan width X. In the lamp 51 of FIG. 5, the distance from points A to C at two ends of the lamp 51 is smaller than the effective scan width X, so the effective scan width X from points B to D extends to the positions above the lamp. Because the angle α in FIG. 5 system is smaller then lens half angle θ, the brightness received by the image sensor will include the light surge at two ends because of the reason of lamp image formation.

Figure 6:
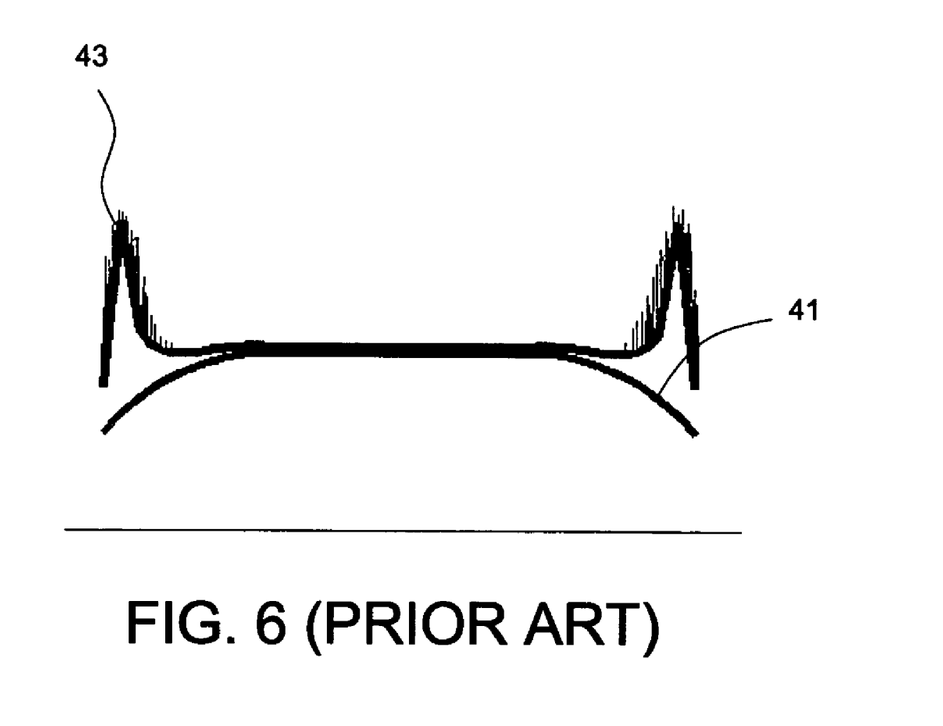
FIG. 6 shows the brightness variations detected by the image sensor from the lamps of FIGS. 2 and 5.

FIG. 6 shows the brightness variations detected by the image sensor from the lamps of FIGS. 2 and 5, wherein the curve 41 denotes the brightness variation of the lamp 21 of FIG. 2, and the curve 43 denotes the brightness variation of the lamp 51 of FIG. 5. The light surge not only tends to cause the over-saturation of the optical signals at two ends of the image sensor, but also makes the color correction computations of the software or firmware unstable and incorrectly, thereby causing abnormally scanned image.

The light surge is generated because the image sensor is used to scan a reflective original, and the light source device is used to provide the light beam. The light beam received by the image sensor is the scattered light but not the reflected light, so the overall utilization efficiency of the light source is originally low, and the difference between the efficiencies of the normally and slantly incident light sources is larger, both of which are the normal physical phenomena. Because the angle α in FIG. 5 system is smaller then lens half angle θ, even the points B and D of the lamp 51 of FIG. 5 extend to the positions above the lamp, a portion of light of the second compensation section C2 is reflected to the image sensor and thus cause the light surge. Hence, the light surge may be avoided without losing the compensating effect if the distance AB and the distance CD exceed some value (depending on the optical system).

Because the distances AB and CD have to exceed some value, the lamp length L1 of FIG. 3A cannot be effectively shortened such that the width of the flatbed scanner also cannot be reduced under the condition that the effective scan width X is fixed. If the lamp 51 of FIG. 5 is utilized to provide the light source, the lamp length can be shortened to L2, but the light surge will be generated again, thereby deteriorating the image quality.

SUMMARY OF THE INVENTION

In view of the above-mentioned problems, it is therefore an object of the invention to provide a light source device utilizing obscuring units to partially obscure the light source of the bent lamp so as to repress the light surge and to compensate for the light source under the condition that the lamp length is shortened.

To achieve the above-mentioned object, the invention provides a light source device capable of repressing the light surge. The light source device includes a bent lamp for generating the light source and compensating for the brightness at two ends of the bent lamp according to two bent structures; and a set of obscuring units fixed at the two bent structures to partially obscure the light of the lamp. Thus, the light surge happened at the two ends of the image sensor can be repressed.

DETAILED DESCRIPTION OF THE INVENTION

The light source device capable of repressing the light surge according to the invention will be described with reference to the accompanying drawings.

The bent lamp is used to compensate the insufficient brightness at two ends of the typical linear lamp, but the distance of the bent lamp between two ends has to be greater than the effective scan width so as to avoid the light surge. This condition limits the further reduction of the length of the lamp. The invention overcomes the limitation that the distance of the bent lamp must be greater than the effective scan width, so as to further shorten the length of the bent lamp. In addition, in order to repress the light surge, two obscuring units are utilized to obscure the light beam at two ends of the lamp close to the image signal inlet 18 so that the light at two ends of the lamp is free from being reflected to the image sensor. Hence, the flatbed scanner using the light source device of the invention may have a narrower width.

Figure 7:
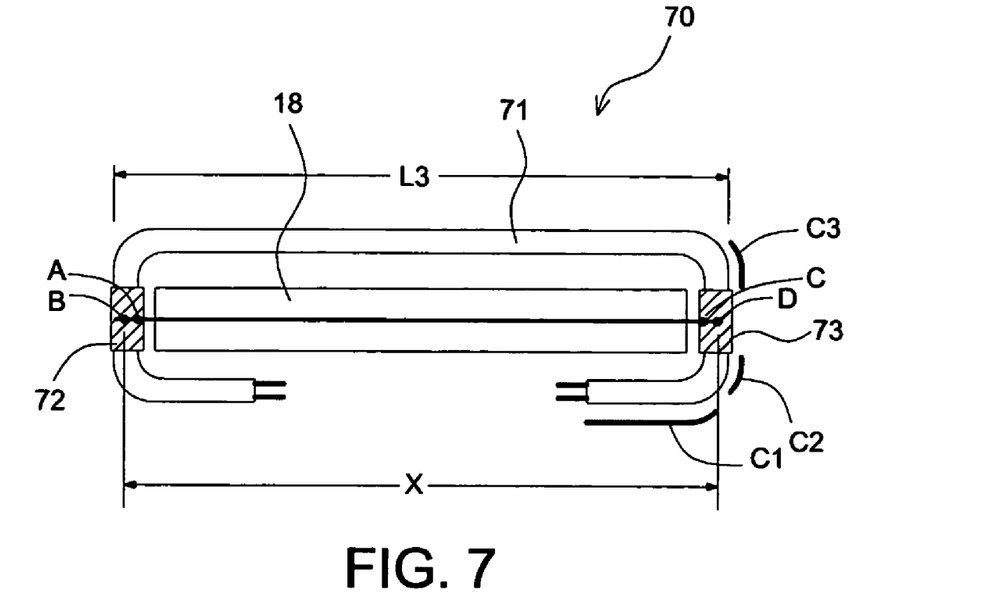
FIG. 7 shows a light source device capable of repressing the light surge according to a first embodiment of the invention.

FIG. 7 shows a light source device capable of repressing the light surge according to a first embodiment of the invention. Referring to FIG. 7, the light source device 70 of the invention capable of repressing the light surge includes a bent lamp 71 and two obscuring units 72 and 73. The architecture and dimension of the bent lamp 71 may be the same as those of the lamp 51 of FIG. 5. The points B and D can extend to the positions over the lamp 71, so the length L3 of the lamp 71 may be equal to the length L2 of the lamp 51 of FIG. 5 but smaller than each of the lamp lengths of FIGS. 2 and 3. The bent lamp 71 has U-shaped structures at two ends thereof, and the two obscuring units 72 and 73 are fixed to the lamp at positions corresponding to two sides of the image signal inlet 18. The light source device 70 may be fixed in the carriage of the flatbed scanner so as to provide the light source for the flatbed scanner to scan the reflective original, as shown in FIG. 1.

Figure 8:
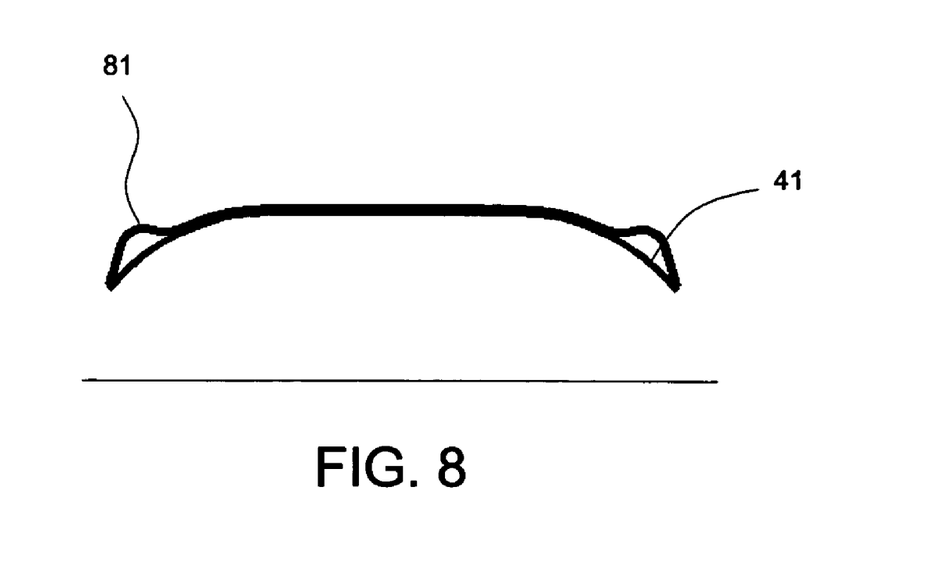
FIG. 8 shows the brightness variations detected by the image sensor from the lamps of FIGS. 2 and 7.

As shown in FIG. 7, the lamp 71 provides three brightness compensation sections C1, C2 and C3, wherein the light between the compensation sections C2 and C3 are obscured by the obscuring units 72 and 73. Hence, the reflected light entering the image sensor from the compensation sections C2 and C3 can be controlled, and no light surge is caused. Because the obscuring units 72 and 73 are used for the purpose of obscuring or weakening the light of some portions of the compensation sections, the obscuring units 72 and 73 may be made of opaque or translucent material and may be, for example, a metal, a diffuser, or the like. FIG. 8 shows the brightness variations detected by the image sensor from the lamps of FIGS. 2 and 7, wherein the curve 41 denotes the brightness variation of the lamp 21 of FIG. 2, and the curve 81 denotes the brightness variation of the lamp 71 of FIG. 7. As shown in FIG. 8, the light surge is not generated at two ends from the light source device of the invention, and the brightness compensation effect is achieved simultaneously. In addition, because the incident angle of the light source at the compensation section of the light source device of the invention is smaller, the utilization efficiency of the scattered light is higher, and the compensation effect is better than that of FIG. 2.

Figure 9:
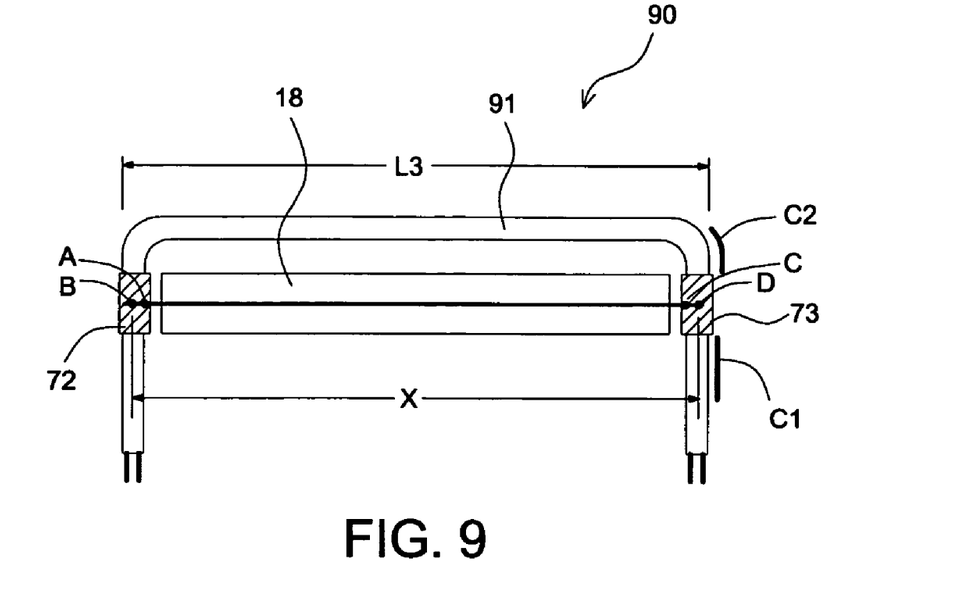
FIG. 9 shows a light source device capable of repressing the light surge according to a second embodiment of the invention.

FIG. 9 shows a light source device capable of repressing the light surge according to a second embodiment of the invention. Referring to FIG. 9, the light source device 90 of the invention capable of repressing the light surge includes a bent lamp 91 and two obscuring units 72 and 73. The embodiment is the same as the first embodiment except for the difference that the bent lamp 91 of the second embodiment is a U-shaped lamp. Hence, the second embodiment only can provide two brightness compensation sections C1 and C2, but a good compensation effect still can be provided.

Figure 10A:
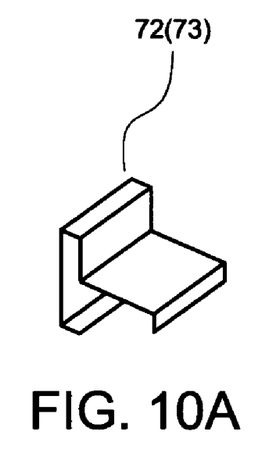
FIG. 10A shows an example of an obscuring unit of the invention.
Figure 10B:
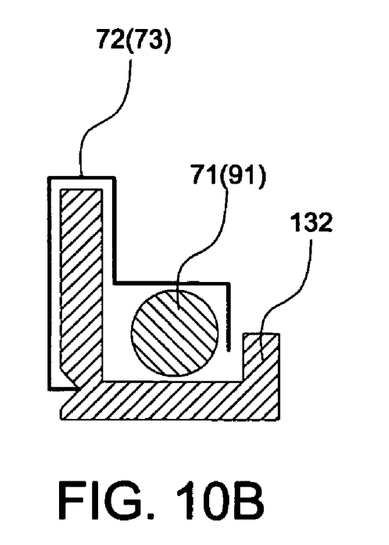
FIG. 10B shows a schematic illustration of the obscuring unit, which is combined with a lamp holder 132.

FIG. 10A shows an example of the obscuring unit 72 (73) of the invention, and FIG. 10B shows a schematic illustration of the obscuring unit 72 (73), which is combined with a lamp holder 132. As shown in FIG. 10A, the obscuring unit 72 (73) may be formed by bending a metal sheet, and the bent shape has to correspond to that of the lamp holder 132. As shown in FIG. 10B, when the obscuring unit 72 (73) is combined with the lamp holder 132, the light at the obscured position of the lamp cannot pass through the obscuring unit 72 (73). Of course, the obscuring unit 72 (73) also may be integrally formed with the carriage (i.e., combined with the carriage in advance). For example, if the two metal sheets are fixed to two sides of the image signal inlet 18 to obscure or weaken the light. In addition, a covering layer also may be directly coated on suitable positions of the lamp to serve as the obscuring unit 72 (73) so as to weaken the light.

Figure 11:
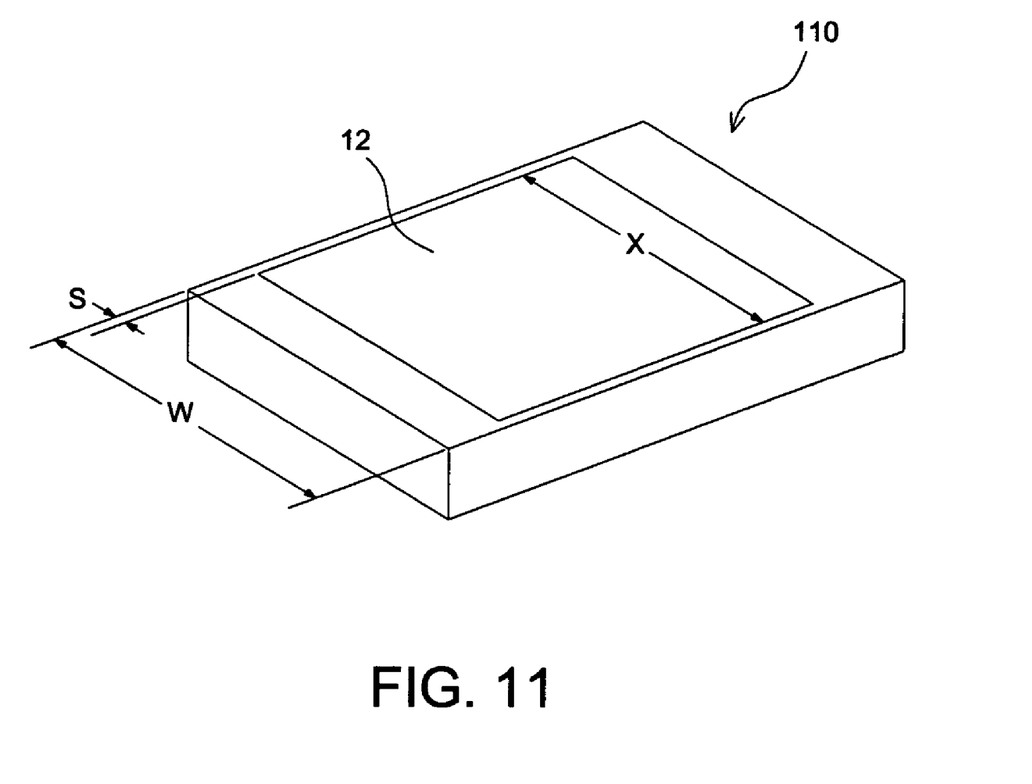
FIG. 11 shows a flatbed scanner using the light source device of the invention, which is capable of repressing the light surge.
Figure 12:
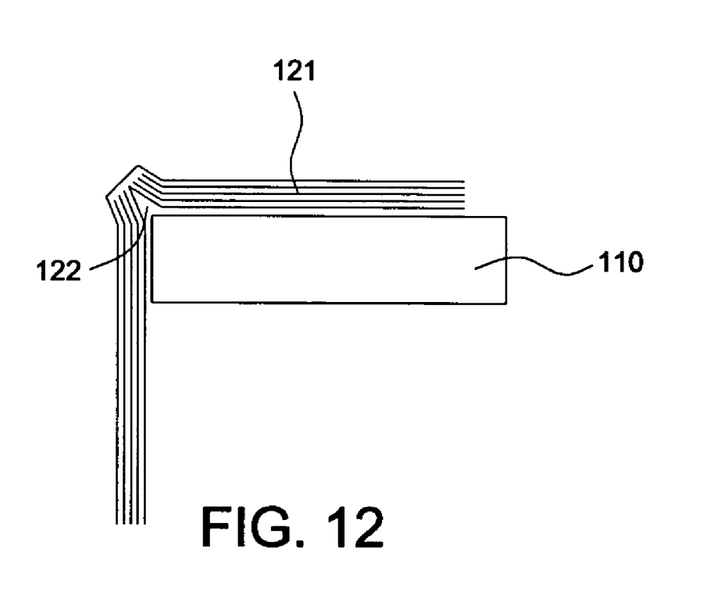
FIG. 12 shows a schematic illustration of a flatbed scanner for scanning a book.

FIG. 11 shows a flatbed scanner using the light source device of the invention, which is capable of repressing the light surge. As shown in FIG. 11, the flatbed scanner 110 uses the light source device of the invention. Because the length of the light source device may be closer to the effective scan width X, the distance S between the scan platen 111 and the housing edge may be minimized, and the width W of the flatbed scanner 110 also may be reduced correspondingly. Hence, a narrower flatbed scanner may be configured. FIG. 12 shows a schematic illustration of a flatbed scanner for scanning a book. Because the dimension S of the flatbed scanner 110 may be minimized, it is advantageous to the scanning of a thick book. That is, as shown in FIG. 12, it is possible to prevent the concave portion 122 of the book 121 from causing the distortion and shadow.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A light source device capable of repressing a light surge, the light source device being used in a flatbed scanner to provide a light beam to scan a document, the flatbed scanner having an image sensor and an image signal inlet for receiving light beam from the document, the light source device comprising:
 a bent lamp having two bent parts at two ends thereof for generating the light beam and compensating for the brightness at the two ends of the bent lamp; and
 a set of obscuring units fixed at the two bent parts to partially obscure the light of the lamp, respectively, so as to repress the light surge caused at the image sensor;
 wherein the bent parts of the lamp are bent toward the image signal inlet.

2. The light source device according to claim 1, wherein the two bent parts of the bent lamp are bent substantially vertically.

3. The light source device according to claim 2, wherein a distance between inner sides of the two ends of the bent lamp is smaller than an effective scan distance of the image sensor.

4. The light source device according to claim 2, wherein a light angle from the lamp to a terminal of the image signal inlet is smaller than a lens half angle.

5. The light source device according to claim 4, wherein each of the obscuring units is an opaque component.

6. The light source device according to claim 4, wherein each of the obscuring units is made of metal.

7. The light source device according to claim 1, wherein each of the obscuring units is a translucent component.

8. The light source device according to claim 1, wherein the obscuring units are coated on the lamp.

9. The light source device according to claim 8, wherein the light source device is fixed to a carriage in the flatbed scanner.

10. The light source device according to claim 1, wherein the image sensor is a charge coupled device.

11. The light source device according to claim 10, wherein the obscuring units and the carriage are integrally formed.

* * * * *